US008074346B2

(12) United States Patent
Qian et al.

(10) Patent No.: US 8,074,346 B2
(45) Date of Patent: Dec. 13, 2011

(54) METHOD OF FABRICATING A RADIO FREQUENCY (RF) MICROELECTROMECHANICAL SYSTEM (MEMS) ASYMMETRICAL SWITCH

(75) Inventors: Jiangyuan Qian, Irvine, CA (US); Hung-Pin Chang, Irvine, CA (US); Bedri A. Cetiner, Irvine, CA (US); Mark Bachman, Irvine, CA (US); Franco DeFlaviis, Irvine, CA (US); Guann-Pyng Li, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/849,925

(22) Filed: Sep. 4, 2007

(65) Prior Publication Data

US 2008/0127482 A1    Jun. 5, 2008

Related U.S. Application Data

(62) Division of application No. 11/080,112, filed on Mar. 14, 2005, now Pat. No. 7,265,647.

(60) Provisional application No. 60/552,906, filed on Mar. 12, 2004.

(51) Int. Cl.
*H01H 11/00* (2006.01)
*H01H 65/00* (2006.01)

(52) U.S. Cl. ............. 29/622; 29/592.1; 29/825; 29/831; 29/846

(58) Field of Classification Search .................... 29/622, 29/600, 610.1, 831, 842, 846, 847, 592.1, 29/625, 825; 216/13, 41; 333/101, 105, 333/258, 262
See application file for complete search history.

(56) References Cited

U.S. PATENT DOCUMENTS

| | | | | |
|---|---|---|---|---|
| 6,115,231 | A | * | 9/2000 | Shirakawa .................... 361/233 |
| 6,529,093 | B2 | * | 3/2003 | Ma ................................ 333/101 |
| 6,639,488 | B2 | | 10/2003 | Deligianni et al. |
| 6,880,235 | B2 | * | 4/2005 | Ma .................................. 29/622 |
| 7,265,647 | B2 | | 9/2007 | Qian et al. |

OTHER PUBLICATIONS

Muldavin et al., "High Isolation CPW MEMS Shunt Switches—Part 2: Design", IEEE Transactions on Microwave Theory and Techniques, vol. 48, No. 6, Jun. 2000, pp. 1053-1056.
Qian et al., "RF MEMS Asymmetric Capacitive Switch with High-Isolation at Selected Low-Microwave Frequency", Microwave and Optical Technology Letters, vol. 49, No. 3, Mar. 2007, pp. 702-706.

* cited by examiner

*Primary Examiner* — Thiem Phan
(74) *Attorney, Agent, or Firm* — Orrick, Herrington & Sutcliffe LLP (57) ABSTRACT

The methods described herein provide for a radio frequency micro-electromechanical systems switch having two or more resonant frequencies. The switch can be configured as a capacitive shunt switch having a deflectable member coupled between two electrodes over a transmission line. A first insulator can be located between one of the electrodes and the deflectable member to form a capacitive element. The deflectable member can be deflectable between an up-state and a down-state, the down-state capacitively coupling the deflectable member with the transmission line. The degree by which the deflectable member overlaps the first insulator can be adjusted to adjust the capacitance of the capacitive element and the resulting resonant frequency.

7 Claims, 11 Drawing Sheets

METHOD OF FABRICATING A RADIO FREQUENCY (RF) MICROELECTROMECHANICAL SYSTEM (MEMS) ASYMMETRICAL SWITCH

CROSS-REFERENCE TO RELATED APPLICATIONS

This application is a divisional of U.S. application Ser. No. 11/080,112, filed Mar. 14, 2005, now U.S. Pat. No. 7,265,647, which claims priority to U.S. provisional application Ser. No. 60/552,906, filed Mar. 12, 2004, which applications are fully incorporated herein by reference.

FIELD OF THE INVENTION

The systems and methods described herein relate generally to micro-electro-mechanical systems (MEMS) and, more particularly, to a MEMS capacitive switch that facilitates high isolation wideband tuning.

BACKGROUND INFORMATION

Radio frequency micro-electromechanical system (RF MEMS) switches are basic building blocks for construction of various RF components and sub-systems such as variable capacitors, phase shifters, tunable RF matching circuits/filters, and reconfigurable antennas, to name a few. RF MEMS switches can be classified in two general groups based on their electrical contact methods: 1) metal-to-metal ohmic (or DC) contact switches, known as resistive series switches, and 2) capacitive contact switches, known as capacitive shunt switches. The resistive series switches typically have a small up-state capacitance, e.g., on the order of 2-8 femtofarads (fF), that exhibits excellent isolation from DC to 20-40 Gigahertz (GHz), and also a small down-state contact resistance of 1-2 ohms ($\Omega$) that results in a low insertion loss of 0.1-0.2 decibels (dB). However, because resistive switches rely on multiple metallic surfaces in contact with each other during current passage, microwelding and stiction become significant drawbacks of resistive switch implementation.

To address these and other drawbacks, capacitive shunt switches were developed using a coplanar waveguide (CPW) topology, in which a metallic membrane of the switch is in contact with an insulative dielectric layer (typically $SiN_x$ or $SiO_2$) that covers the signal electrode of the conductive line. The shunt capacitive switch typically has an up-state capacitance of 20-70 fF and low signal line resistance of 0.1$\Omega$ that results in a low insertion loss. When the capacitive switch is closed, it has a down-state capacitance of 2-5 picofarads (pF) yielding an almost ideal RF short to ground, thereby providing high isolation only at relatively high radio frequencies (e.g., above 15 GHz).

Although capacitive RF MEMS switches have advantages over resistive switches in the amelioration of microwelding and stiction issues, the isolation of capacitive switches tends to be fair (20 dB) at 10-25 GHz and poor (~10 dB) below 10 GHz. This poor isolation at frequencies below 10 GHz precludes capacitive switches from being employed for most commercial applications. Various designs to improve the isolation of capacitive switches in the down-state have been proposed. For instance, some designs, referred to as inductively tuned X-Band switches, have added an additional inductive conductive-line section to the standard design in order to achieve an 8 dB improvement in isolation. However, these X-Band switches only achieve improved isolation in the 10+ to 12 GHz frequency range because it becomes very difficult to further lower the resonant frequency to C-band frequencies due to the impractically large inductance required. To sufficiently increase the inductance requires a shape change of conductive line and brings in discontinuity for the waveguide, which requires difficult design compensations.

Accordingly, it would be desirable to provide capacitive RF MEMS switches capable of achieving higher isolation across low frequency ranges.

SUMMARY

The systems and methods described herein provide for an RF MEMS switch having two or more resonant frequencies. In one exemplary embodiment, which is described below as an example only and not to limit the invention, the switch includes a first electrode and a second electrode having a first insulator located thereon, a conductive line located between the first and second electrodes and having a second insulator located thereon and a deflectable member coupled with the first electrode and the first insulator located on the second electrode, where the deflectable member is in spaced relation with the conductive line. The deflectable member is preferably deflectable between an up-state, which can be out of contact with the second insulator, and a down-state, which is preferably capacitively coupled with the second insulator. The switch preferably has two resonant frequencies in the down-state. The lower resonant frequency can be adjusted, in part, by adjusting the area that the deflectable member covers the first insulator.

The switch can also include one or more mode conversion members suspended between the first electrode and the second electrode and over the conductive line at a predetermined distance from the deflectable member. The mode conversion member can have a first side and a second side opposite the first side, where the conductive line is configured to allow propagation of an RF signal in a coplanar waveguide (CPW) mode along a first portion of the conductive line located between the deflectable member and the first side of the mode conversion member, and in both a coupled slotline (CSL) mode and the CPW mode along a second portion of the conductive line located adjacent to the second side of the mode conversion member.

Also provided is an example method of fabricating an RF MEMS switch, which is described below as an example only and not to limit the invention. The example method can include forming a first electrode, a second electrode and a conductive line between the first and second electrodes, then forming a first insulator layer on at least a portion of the second electrode and a second insulator layer on at least a portion of the conductive line located between the electrode and suspending a deflectable member between the first and second electrodes and over the insulator layer on the conductive line, where the deflectable member covers at least a portion of the first electrode and at least a portion of the insulator layer on the second electrode. The first electrode, second electrode and conductive line can all be formed on a printed circuit board (PCB) substrate.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

DETAILED DESCRIPTION

The systems and methods described herein provide for an RF MEMS capacitive switch capable of wideband tuning at low frequencies with high isolation. In a preferred exemplary embodiment, the switch operates in a CPW mode having a first resonant frequency and a coupled slotline (CSL) mode having a second, lower resonant frequency. The second resonant frequency position can be controlled by adjusting the inductance of the transmission line and/or the capacitance of the switch. The second resonant frequency, in one exemplary embodiment, can be in the range of 2-10 Ghz, which is a range suitable for use in many commercial wireless applications.

FIGS. 1A-D depict exemplary embodiments of RF MEMS system 100 including the capacitive switch 102 and two mode conversion members 120 and 122. Here, the switch 102 has a first electrode 104, a second electrode 106 and a conductive line 108 located on a substrate 110. The second electrode 106 and the conductive line 108 are each covered by insulators 107 and 109, respectively. A deflectable member 112 is coupled with the first electrode 104 and the first insulator 107 and placed in spaced relation with the conductive line 108 and second insulator 109. The deflectable member 112 is preferably deflectable between a first position, or up-state, shown in the top view of FIG. 1A and the cross-sectional view of FIG. 1B, taken along line 1B-1B, and a second position, or down state, shown in the cross-sectional view of FIG. 1C, also taken along line 1B-1B.

Figure 1A:
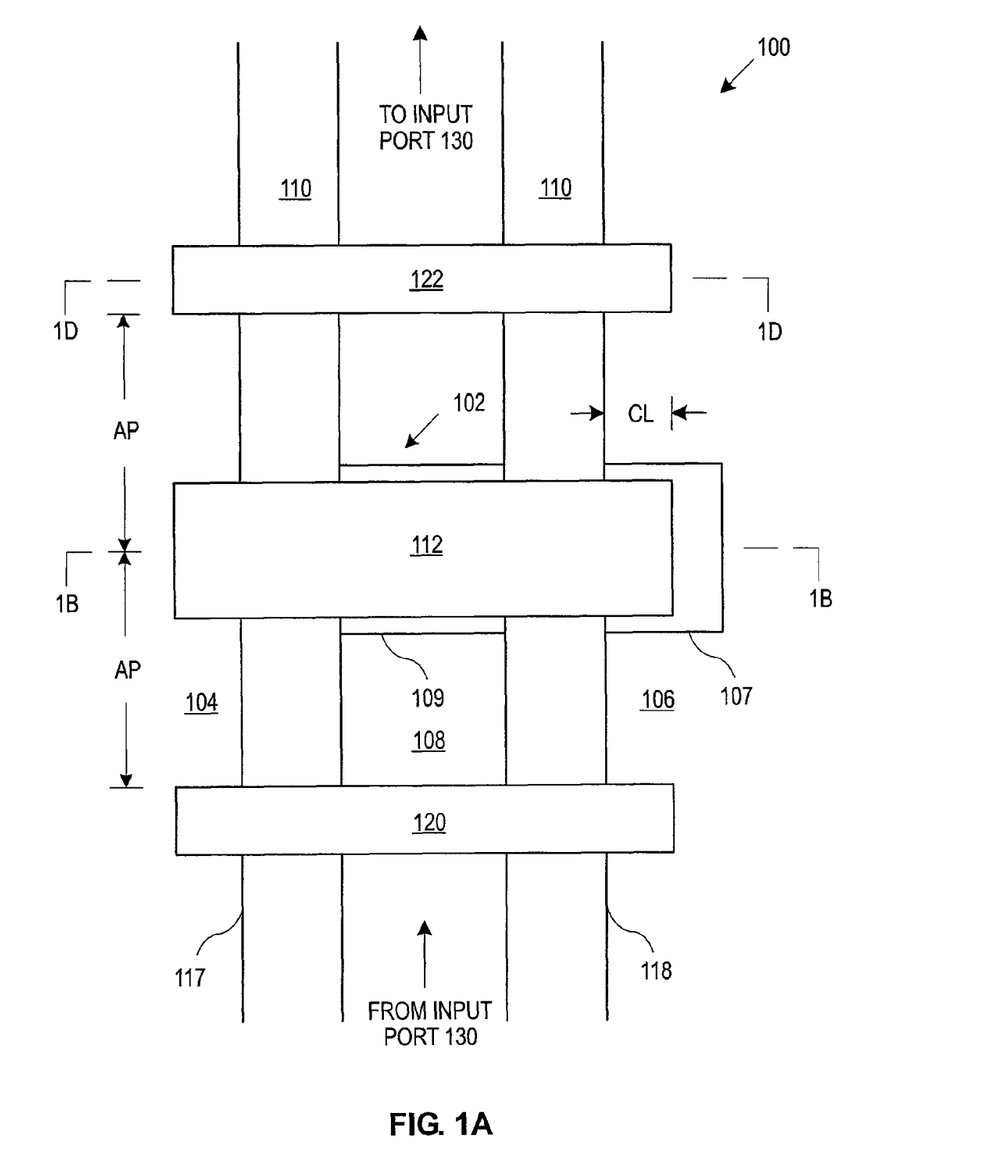
FIG. 1A is a top-down view depicting one exemplary embodiment of the RF MEMS system.
Figure 1B:
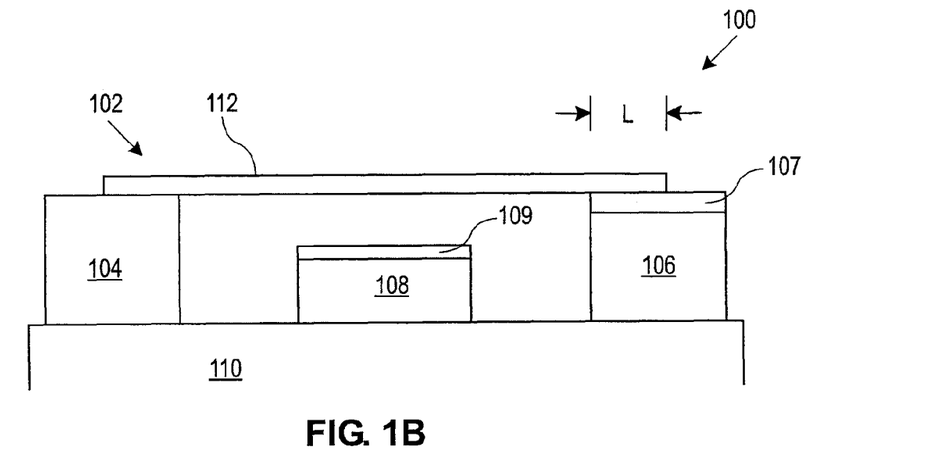
FIGS. 1B-C are cross-sectional views taken along line 1B-1B of FIG. 1A depicting additional exemplary embodiments of the RF MEMS system.
Figure 1C:
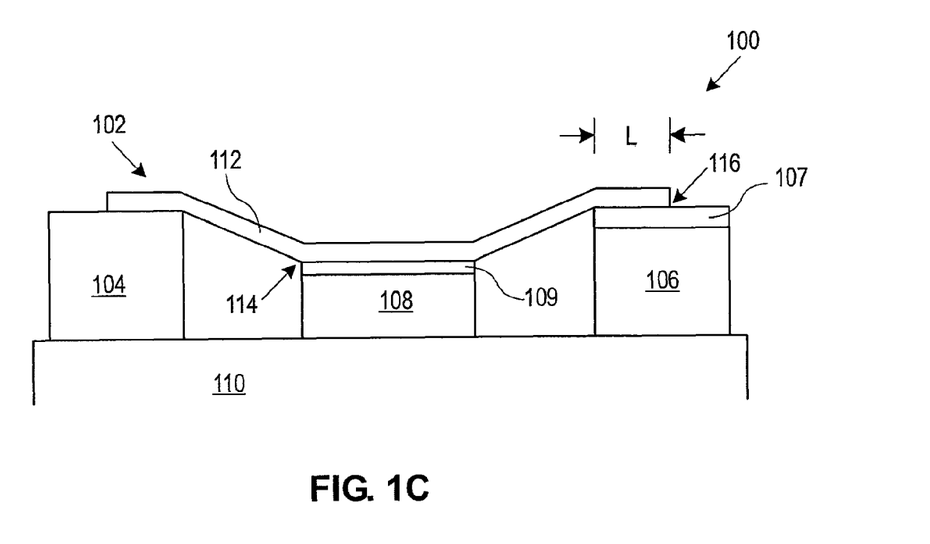

The conductive line 108 is preferably configured as a transmission line for allowing the propagation of an RF signal between an input port 130 and an output port 132. The electrodes 104 and 106 can be coupled with a common voltage node placed at a single potential, which is preferably ground. The switch 102 operates in a manner similar to a conventional capacitive shunt switch. When the difference in electric potential between the deflectable member 112 and the transmission line 108 becomes great enough, the attractive force causes the deflectable member to deflect from the up-state, where the deflectable member 112 is preferably out of contact with the insulator layer 109 and conductive line 108, to the down-state, where the deflectable member 112 is preferably coupled with or in close proximity to the insulator layer 109. Once in the down-state, the deflectable member 112 is capacitively coupled with the transmission line 108 and can yield an almost ideal RF short to ground, thereby isolating the input port 130 from the output port 132.

Figure 1D:
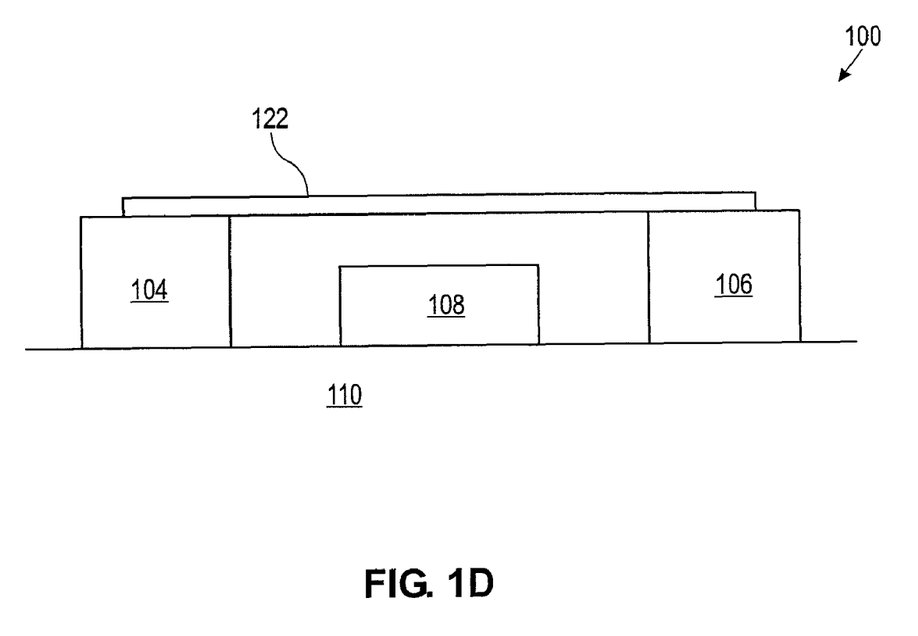
FIG. 1D is a cross-sectional view taken along line 1D-1D of FIG. 1A depicting another exemplary embodiment of the RF MEMS system.

The mode conversion members 120 and 122 are preferably configured facilitate interfacing with other components in system 100. The mode conversion members 120 and 122 are preferably each located a predetermined distance AP from the deflectable member 112, which in this embodiment is substantially the same distance. Here, the mode conversion members 120 and 122 are symmetrically coupled with electrodes 104 and 106 and placed in spaced relation over the transmission line 108. FIG. 1D is a cross-sectional view taken along line 1D-1D of FIG. 1A and depicts one exemplary embodiment of mode conversion member 122, which is substantially similar to mode conversion member 120.

In the embodiments depicted in FIGS. 1A-D, the combination of the deflectable member 112, the insulator layer 109 and the transmission line 108 forms a first metal-insulator-metal (MIM) capacitive element 114 and the combination of the deflectable member 112, the insulator layer 107 and the second electrode 106 forms a second MIM capacitive element 116, referred to herein as the tuning capacitor 116.

Introduction of the tuning capacitor 116 introduces asymmetry into the switch 102 and break the CPW symmetry properties of signal propagation along the transmission line 108. The RF signal instead propagates in the CSL mode where the electric field potential has the same direction in both gaps 117 and 118, as opposed to the CPW mode where the electric field potential has opposite directions in each gap 117 and 118. Placement of the symmetric mode conversion members 120 and 122 causes the RF signal to switch modes from the CPW mode to the CSL mode and back. For instance, an RF signal propagating from input port 130 to mode conversion member 120 is preferably in the CPW mode, once past mode conversion member 120, the RF signal converts to the CSL mode where it stays until it reaches mode conversion member 122. Mode conversion member 122 causes the RF signal to convert back to the CPW mode where it remains until it reaches output port 132. It should be noted that introduction of the asymmetry can be accomplished in any manner desired, and is not limited to use of a MIM capacitive element such as the one described with respect to FIGS. 1A-C. Also, system 100 is not limited to the bridge-like mode conversion members 120 and 122 depicted in FIGS. 1A-D and, in fact, any mode conversion member configuration capable of converting between the CPW and CSL modes can be used.

As mentioned above, the tuning capacitance can be adjusted to adjust the lower resonant frequency of the switch 102. The capacitance of the tuning capacitor 116 is preferably adjusted by adjusting the degree by which the deflectable member 112 overlaps the second electrode 106, indicated by CL in FIGS. 1A-C. Generally, the greater the overlap length CL, the larger the capacitance of the tuning capacitor 116. Because the resonant frequency has an approximate linear relationship with the tuning capacitance, then the greater the tuning capacitance, the lower the resonant frequency. Adjustment of the overlap length CL does not have a significant effect on the electrical and mechanical properties of the deflectable member 112 and, therefore, minimum effort in design of switch 102 is required.

One of skill in the art will readily recognize that the manner in which the capacitance of the tuning capacitor is adjusted is dependent on the layout and configuration of the tuning capacitor 116. The systems and methods described herein are not limited to a tuning capacitor 116 formed by overlapping layers. In fact, the systems and methods described herein can be implemented with any type, configuration or placement of the tuning capacitor 116, the capacitance of which can be adjusted in any manner suitable for the actual implementation.

Figure 2A:
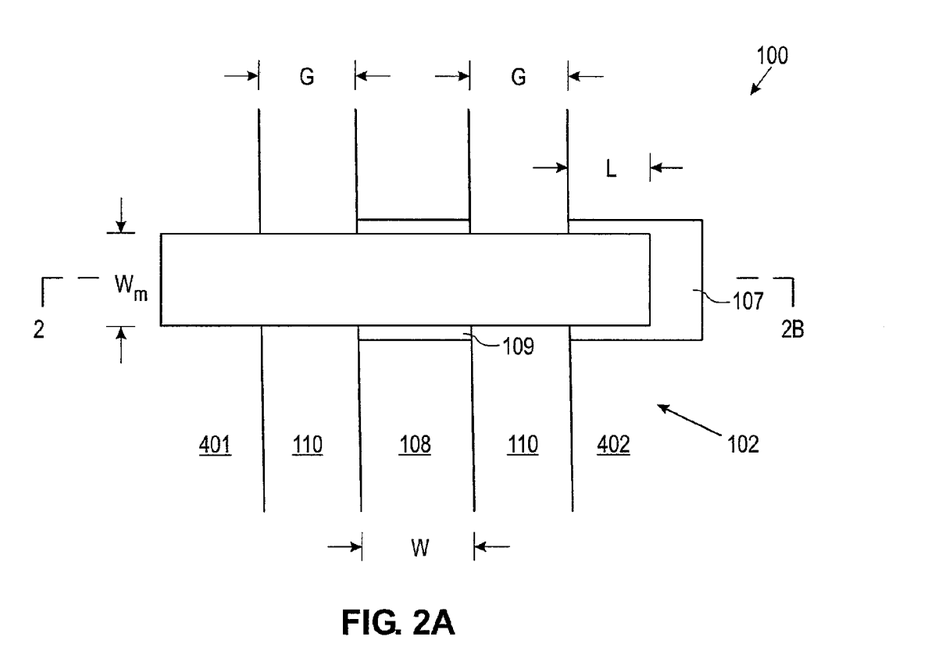
FIG. 2A is a top-down view depicting another exemplary embodiment of the RF MEMS system.
Figure 2B:
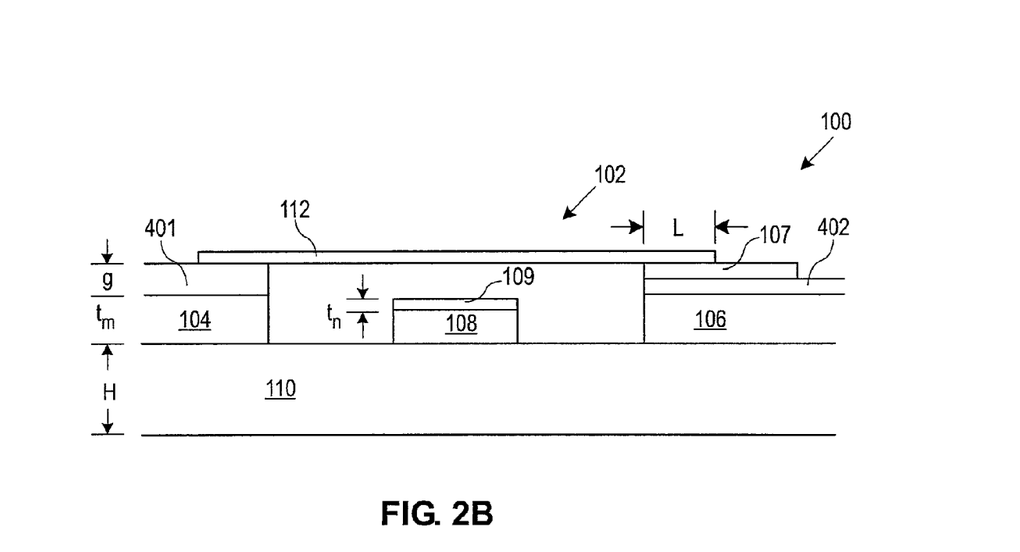
FIG. 2B is a cross-sectional view taken along line 2B-2B of FIG. 2A depicting another exemplary embodiment of the RF MEMS system.

FIGS. 2A-B depict another exemplary embodiment of the RF MEMS system 100 having switch 102 (mode conversion members 120 and 122 are preferably included although not shown). FIG. 2A depicts a top-down view of the switch 102 and FIG. 2B depicts a cross-sectional view of the switch 102 taken along line 2B-2B. In this embodiment, the switch 102 is fabricated on a printed circuit board (PCB) substrate 110 using a low temperature deposition process such as that described in U.S. patent application Ser. No. 10/751,131, filed on Dec. 31, 2003 and entitled "MEMS Fabrication on a Laminated Substrate," which is fully incorporated by reference herein. Each electrode 104 and 106 is covered with a conductive layer 401 and 402, such as copper, in order to raise the height of the electrodes 104 and 106 relative to the transmission line 108. In this embodiment, the width W of the transmission line 108 is 200 micrometers (µm), the width G of the gaps between the transmission line 108 and either electrode 104 and 106 is 45 µm and the thickness H of the substrate is 1.5 millimeters (mm). Also, the thickness $t_m$ of the transmission line 108 and the electrodes 104 and 106 is approximately 17 µm, the thickness g of the conductive layers 401 and 402 is approximately 5 µm, the thickness $t_n$ of the insulator layers 107 and 109 is approximately 0.2 µm and the width $W_m$ of the deflectable member 112 is approximately 200 µm.

Figure 3:
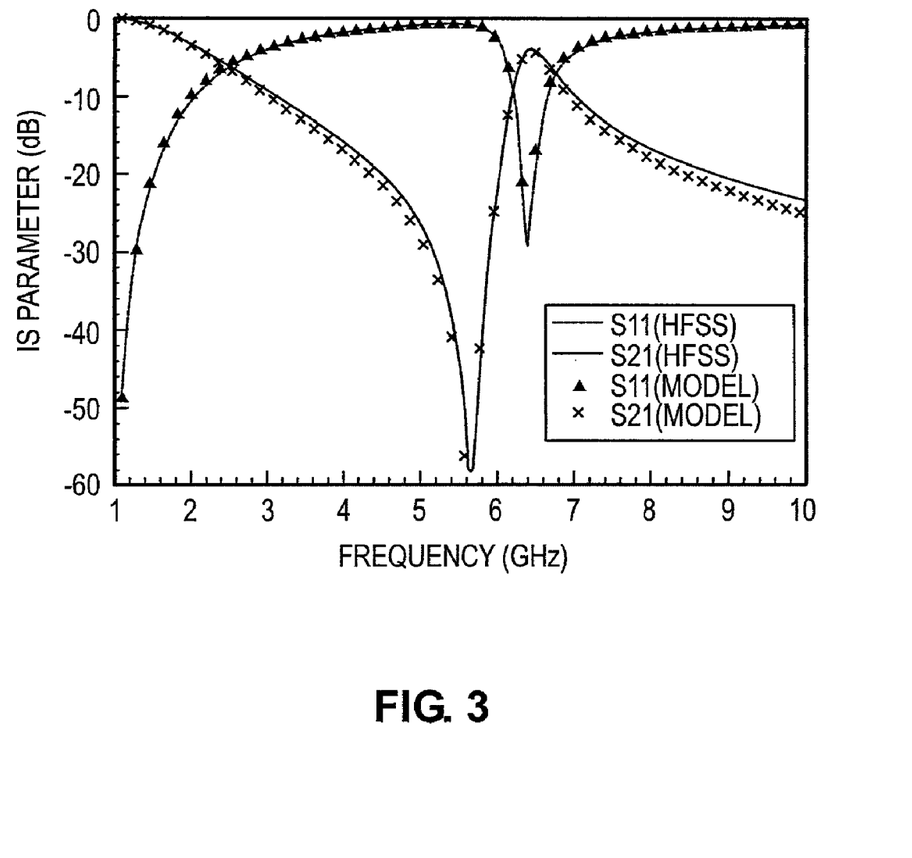
FIG. 3 is a graph depicting the S-parameters versus frequency for the exemplary embodiment of the RF MEMS system switch depicted in FIGS. 2A-B.

FIG. 3 depicts the simulation results of the S-parameters of the exemplary embodiment of the switch 102 in FIGS. 2A-B in the down-state. The simulation results using the Ansoft High Frequency Structure Simulator (HFSS) as well as the simulation results from the electromagnetic (EM) structure model are shown. The EM model includes a 0.1 µm air gap between the deflectable member 112 and the electrode 104 because in practical applications, the contact here may be less than ideal due to surface roughness. In this embodiment, the distance AP of the mode conversion members 120 and 122 from the deflectable member 112 is 0.5 mm and the overlap length CL is 25 µm. As can be seen, the $S_{21}$ parameter has a resonant frequency ($f_{21L}$) at 5.2 Ghz with 28 dB of isolation and the $S_{11}$ parameter has a resonant frequency at 6 Ghz. The $S_{21}$ and $S_{11}$ parameters cross each other at a frequency ($f_c$) of 1.6 Ghz, which is determined in part by the tuning capacitance ($C_T$).

Figure 4:
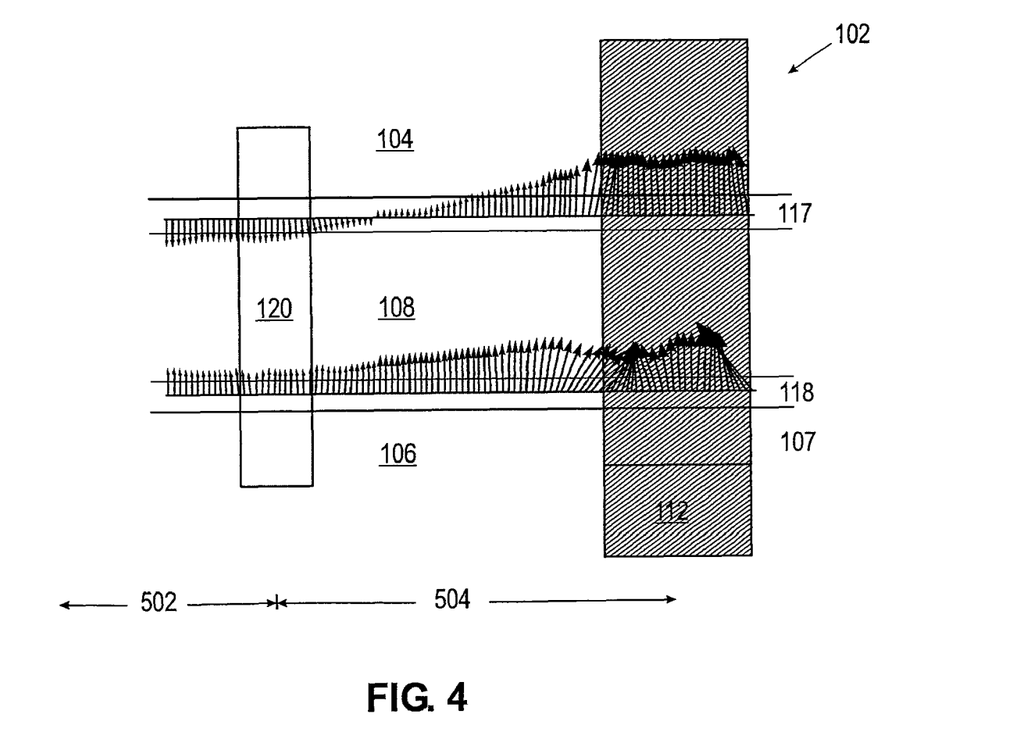
FIG. 4 is a illustrative view depicting the electric field phase in the exemplary embodiment of the RF MEMS system switch depicted in FIGS. 2A-B.

FIG. 4 depicts the simulated electric field distribution along a line in the center of each of gaps 117 and 118 for the exemplary embodiment of the switch 102 depicted in FIGS. 2A-B, where the distance AP of the mode conversion members 120 and 122 from the deflectable member 112 is 0.5 mm, the overlap length CL is 75 µm and the RF signal frequency is 5.2 Ghz. As can be seen here, in portion 502 to the left of mode conversion member 120, the RF signal travels in the CPW mode. While in the CPW mode, the phase, or direction (indicated by the arrows), of the electric field in each of the gaps 117 and 118 is opposite and act to cancel each other out. In portion 504 located between mode conversion member 120 and the deflectable member 112, the RF signal is converted into both the CPW mode and the CSL mode. While in the CSL mode, the phase of the electric field in each of the gaps 117 and 118 is the same resulting in the accumulation of those fields.

Figure 5:
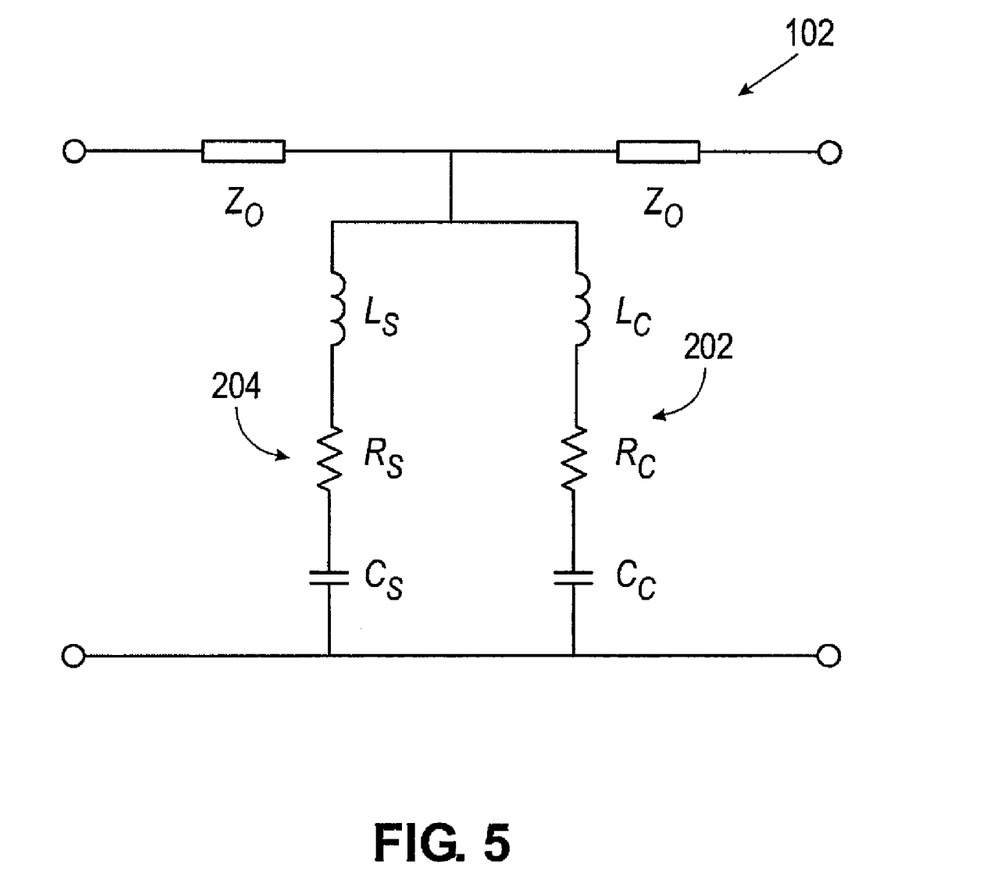
FIG. 5 is a schematic view of another exemplary embodiment of the RF MEMS system switch in the down-state.

A schematic of an exemplary embodiment of the switch 102 in the down-state is depicted in FIG. 5. Here, the switch 102 includes two RLC paths 202 and 204. RLC path 202 includes inductive element $L_C$, capacitive element $C_C$ and resistive element $R_C$, while RLC path 204 includes inductive element $L_S$, capacitive element $C_S$ and resistive element $R_S$. In this embodiment, the RLC path 202 determines the resonant frequency of the CPW mode and the RLC path 204 determines the resonant frequency of the CSL mode. The overlap length CL controls how much energy is reflected in the CSL and CPW modes, thus determining the value of $C_S$ and $C_C$. The inductance $L_S$ is determined by how far the signal travels in the CSL mode, i.e., the distance AP between the deflectable member 112 and the mode conversion member 120 or 122. The resonant frequency can therefore be adjusted to a lower frequency by increasing the value of CL and/or AP. The inductance $L_C$ corresponds to the inductance of the deflectable member 112.

The switch shunt impedance Z is given by (1):

$$Z = \left(R_S + j\omega L_S + \frac{1}{j\omega C_S}\right) \| \left(R_C + j\omega L_C + \frac{1}{j\omega C_C}\right) \quad (1)$$

The S-parameters in a $Z_0$ two-port network system of a shunt impedance are given by (2) and (3):

$$S_{11} = \frac{-Z_0}{2Z + Z_0} \quad (2)$$

$$S_{21} = \frac{2Z}{2Z + Z_0} \quad (3)$$

When $S_{11}$ and $S_{21}$ are crossed at a low frequency $f_c$, $$Z = \frac{1}{2} Z_0.$$

Since at low frequency the impedance due to resistance and inductance can be neglected compared with that due to the capacitance, the total value of $C_S$ and $C_C$ can be determined by (4):

$$C_S + C_C = \frac{1}{\pi f_c Z_0} \qquad (4)$$

The lower resonant frequency $f_{21L}$ of $S_{21}$ generated by the CSL mode is given by $$f_{21L} = \frac{1}{2\pi\sqrt{L_S C_S}} \qquad (5)$$

The return loss $S_{11}$ will also have a resonant frequency $f_{11}$ when it equals zero. By plugging (1) into (2), one can obtain the return loss resonant frequency as (6)

$$f_{11} = \frac{1}{2\pi\sqrt{(L_S + L_C)\frac{C_S C_C}{C_S + C_C}}} \qquad (6)$$

Since the membrane inductance $L_C$ is much smaller than the transmission line 108 inductance $L_S$, it can be neglected at first. By combining (4), (5) and (6), one can determine $L_S$, $C_C$ and $C_C$, which are the major contribution to the equivalent circuit model.

From the S-parameters of the switch 102 with AP at 0.5 mm and CL at 25 μm at the down-state as shown in FIG. 3, $L_S$, $C_S$ and $C_C$ can be calculated as 940 picoHenries (pH), 1.02 pF and 2.96 pF, respectively. In this embodiment, the S-parameters calculated from the equivalent circuit model fit very well with those from the EM simulation after adjusting the values of $R_S$, $R_C$ and $L_C$ as shown in FIG. 3.

Figure 6A:
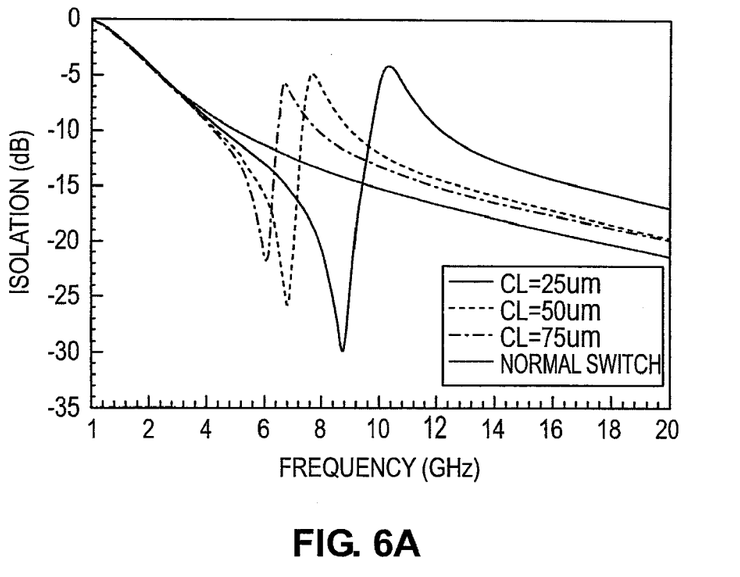
FIG. 6A is a graph depicting the isolation versus frequency for various overlap lengths in the exemplary embodiment of the RF MEMS system switch depicted in FIGS. 2A-B.
Figure 6B:
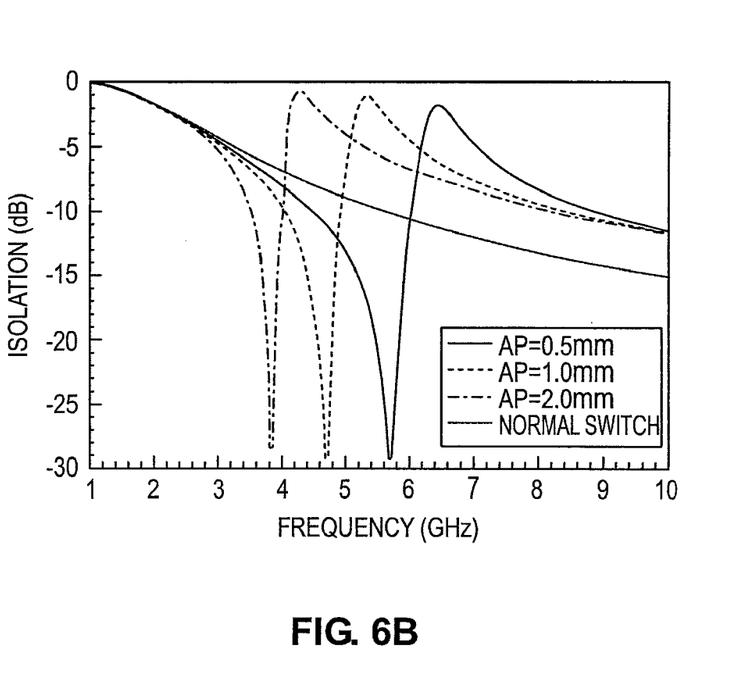
FIG. 6B is a graph depicting the isolation versus frequency for various mode conversion member distances in the exemplary embodiment of the RF MEMS system switch depicted in FIGS. 2A-B.

The simulated isolation as a function of frequency for different overlap lengths CL and positions AP of the mode conversion members 120 or 122, are depicted in FIGS. 6A-B, respectively. For comparison, the RF performance of a conventional MEMS capacitive switch with the same dimensions is also shown. When AP is 2.0 mm and CL is 25 μm, the switch 102 has a resonant frequency of 3.1 GHz with isolation as high as 28 dB, while the regular MEMS switch has only 6 dB of isolation. When AP is shortened to 1 mm and 0.5 mm, the inductance $L_S$ decreases and the resonant frequencies are 4 GHz and 5.2 GHz, respectively. The isolation at these resonant frequencies improves to 21 dB and 19 dB, respectively.

Table I presents the equivalent circuit model parameters for embodiments of the switch 102 with CL fixed at 25 μm. The sum of $C_S$ and $C_C$ corresponds to the deflectable member 112 capacitance and the capacitance of the MIM element 116 and remains constant. It should be noted that the individual value of these two capacitances is determined by the value of CL. It can be seen here that the values of $C_S$ and $C_C$ do not change for different positions AP since the value of CL is fixed.

TABLE I

| AP (mm) | $L_S$ (pH) | $C_S$ (pF) | $C_C$ (pF) |
|---|---|---|---|
| 0.5 | 940 | 1.02 | 2.96 |
| 1.0 | 1450 | 1.07 | 2.83 |
| 2.0 | 2730 | 0.97 | 2.89 |

It should be noted that additional capacitive (or inductive) elements can be included in system 100 to provide a third or more resonant frequencies or to further tune the first or second resonant frequencies. For instance, an additional capacitive or inductive element can be placed between the deflectable member 112 and ground in order to provide a third resonant frequency. Alternatively, an additional capacitive or inductive element can be placed in series with the MIM capacitive element 116 to allow further fine tuning of the resonant frequency.

Figure 7:
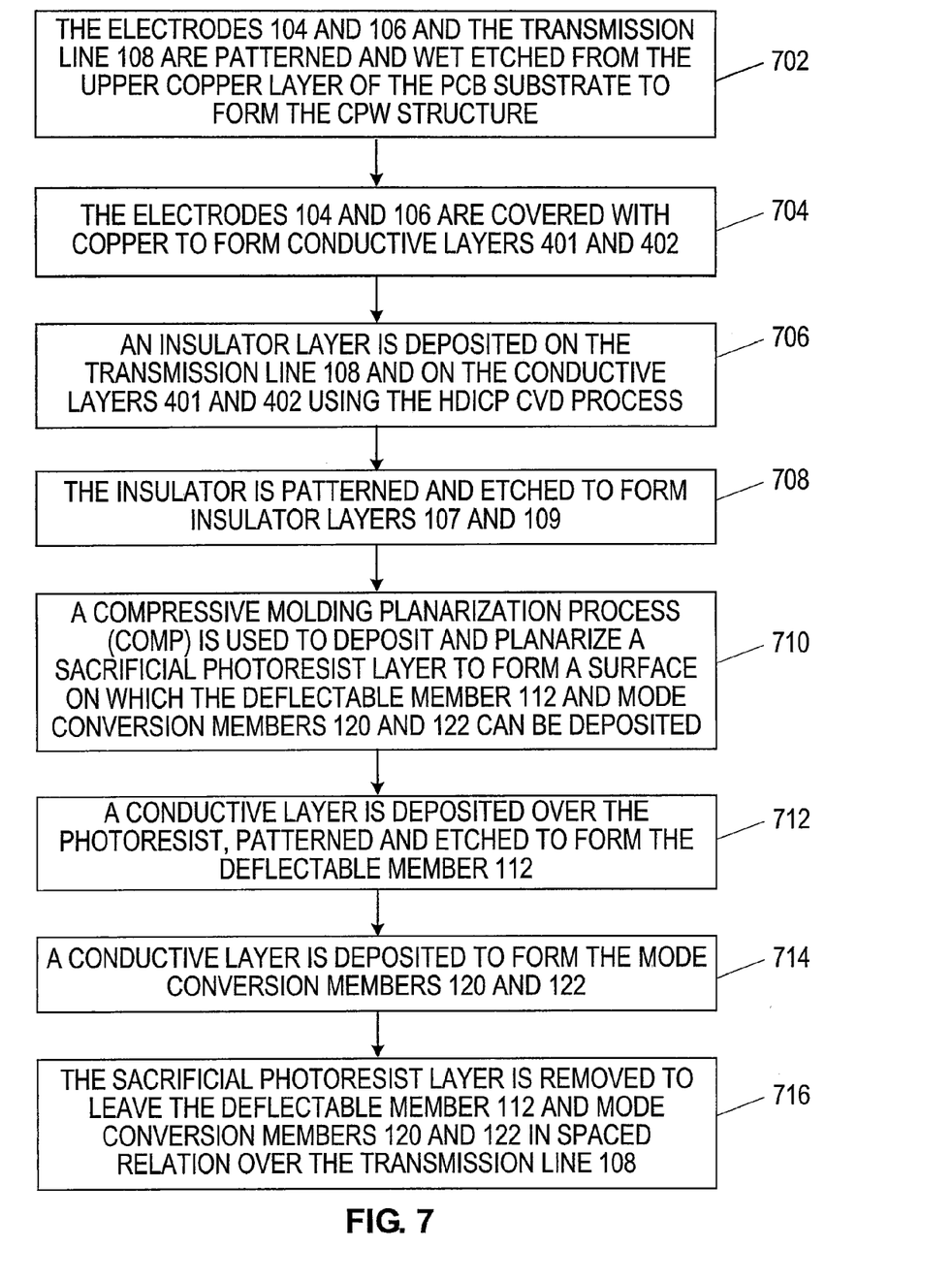
FIG. 7 is a flow diagram depicting an exemplary method of fabricating an exemplary embodiment of the RF MEMS system.

As mentioned above, the switch 102 can be fabricated directly on PCB substrate 110 using a low temperature deposition process such as high density inductively coupled plasma chemical vapor deposition (HDICP CVD), which is described in more detail in U.S. patent application Ser. No. 10/751,131. FIG. 7 depicts one exemplary method 700 of fabricating the switch 102 with the HDICP CVD process. It should be noted however that switch 102 can be fabricated with any process that allows fabrication directly on the PCB substrate 110. First, at 702, the electrodes 104 and 106 and the transmission line 108 are patterned and wet etched from the upper conductive layer of the PCB substrate, preferably copper, to form the CPW structure. The transmission line 108 is preferably a 50Ω transmission line. The electrodes 104 and 106 can extend outwards from the transmission line 108 as far as desired.

Next, at 704, the electrodes 104 and 106 are covered, preferably electroplated, with a conductive layer, such as copper and the like, to form conductive layers 401 and 402. Then, at 706, an insulator layer, such as silicon nitride and the like, is deposited on the transmission line 108 and on the conductive layers 401 and 402 using the HDICP CVD process. At 708, the silicon nitride layer is patterned and etched, preferably with reactive ion etching (RIE), to form insulator layers 107 and 109.

Next, at 710, a compressive molding planarization process (COMP), which is also described in U.S. patent application Ser. No. 10/751,131, is used to deposit and planarize a sacrificial photoresist layer to form a surface on which the deflectable member 112 and mode conversion members 120 and 122 can be deposited. The photoresist is preferably planarized to substantially the same height as the electrodes 104 and 106, conductive layers 401 and 402 and insulator layer 107 (in regions where present). It should be noted that any process can be used to form the underlying surface of the deflectable member 112 and mode conversion members 120 and 122 and that method 700 is not limited to the COMP process.

At 712, a conductive layer, such as aluminum and the like, is deposited over the photoresist, patterned and etched to form the deflectable member 112. At 714, a conductive layer is deposited, preferably electroplated, to form the mode conversion members 120 and 122 if optionally desired. Finally, at 716, the sacrificial photoresist layer is removed to leave the deflectable member 112 and mode conversion members 120 and 122 in spaced relation over the transmission line 108.

Figure 8A:
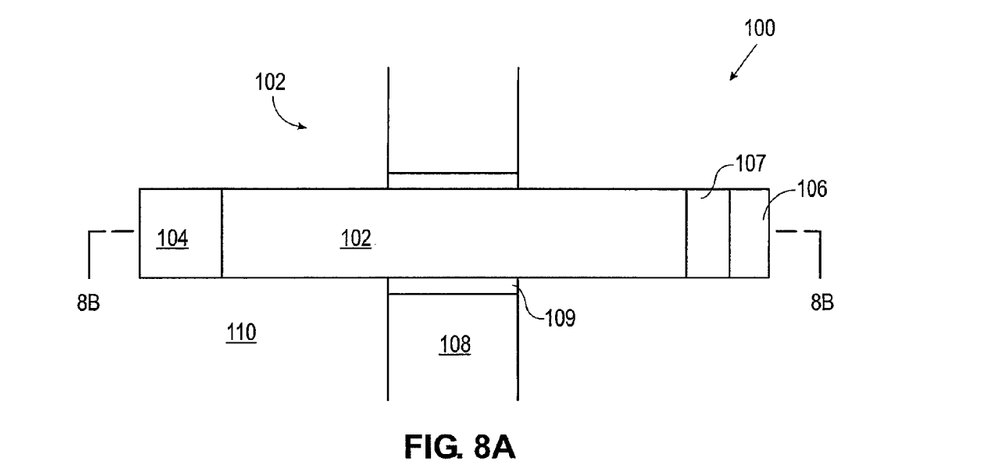
FIG. 8A is a top-down view depicting another exemplary embodiment of the RF MEMS system.
Figure 8B:
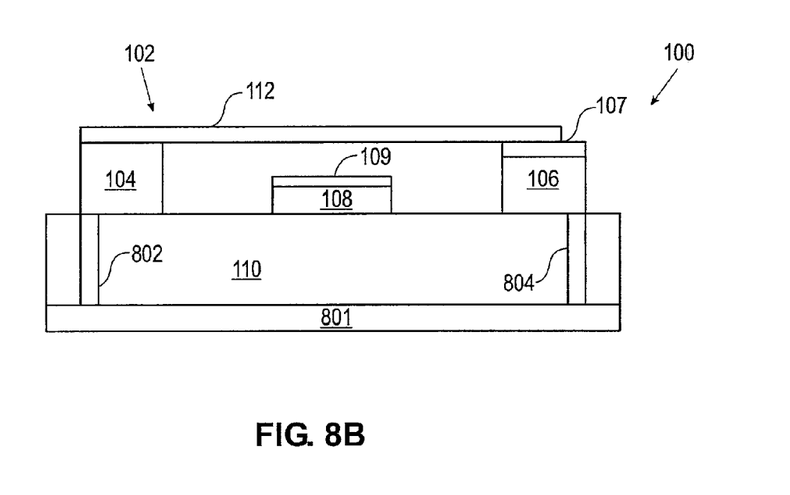
FIG. 8B is a cross-sectional view taken along line 8B-8B of FIG. 8A depicting another exemplary embodiment of the RF MEMS system.
Figure 9:
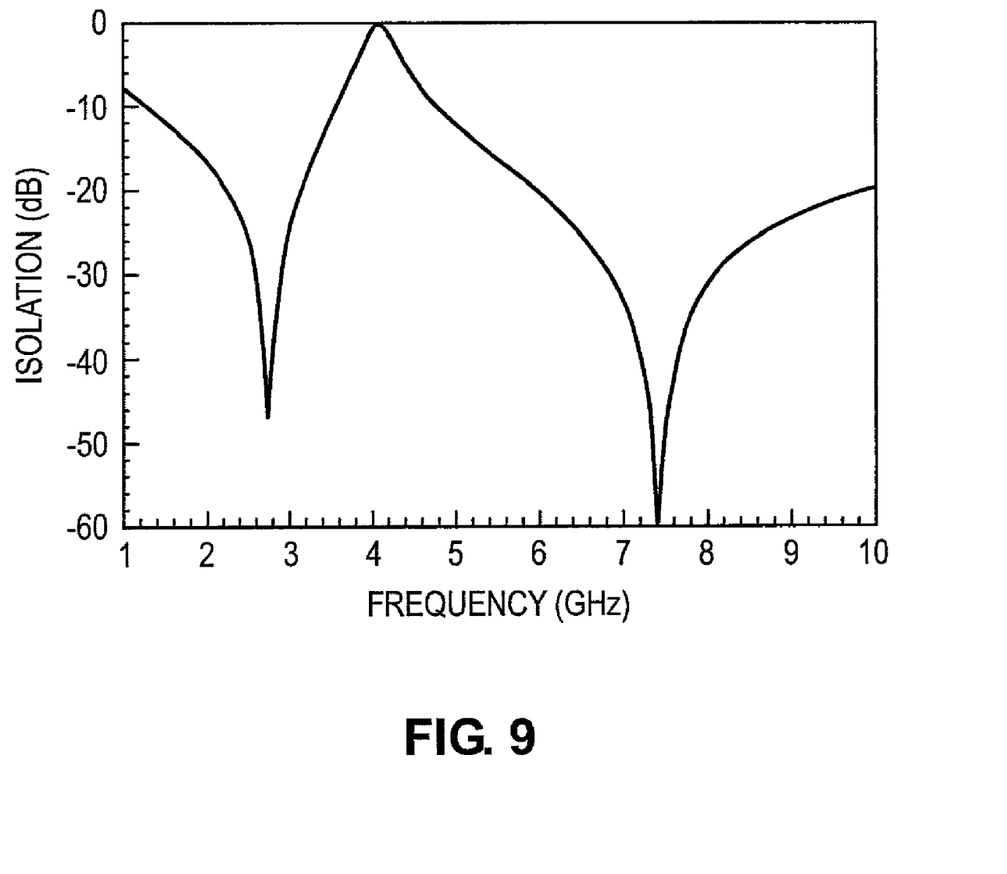
FIG. 9 is a graph depicting the isolation versus frequency for the exemplary embodiment of the RF MEMS system switch depicted in FIGS. 8A-B.

FIGS. 8A-B depict another exemplary embodiment of the RF system 100 having the switch 102. FIG. 8A depicts a top-down view of the switch 102 and FIG. 8B depicts a cross-sectional view taken along line 8B-8B. In this embodiment, the electrodes 104 and 106 are configured as posts and are coupled with the ground plane 801 of the PCB substrate 110 by way of via connections 802 and 804. The transmission line 108 is configured as a microstrip line coupled with an input and an output port (not shown). Conventional capacitive microstrip-based switches typically have one resonant frequency in the range of 2 to 8 Ghz. By introducing the tuning capacitor 116, the single resonant frequency splits into two resonant frequencies also in the range from about 2 to 8 GHz, as depicted in FIG. 9, resulting in a dual-band tunable asymmetric microstrip RF MEMS switch. These two resonant frequencies can be each tuned to any desired frequency range with the operating band, allowing the switch 102 to be employed in a dual band RF system, such as frequency reconfigurable antenna and the like.

One of skill in the art will readily recognize that the simulation results of FIGS. 3, 4, 6A-B and 9 are directly related to the exemplary values of their respective embodiments. Variations in these values will likewise produce variations in the simulation results. The simulation results of FIGS. 3, 4, 6A-B and 9 and the values of the exemplary embodiment of FIGS. 2A-B are intended only to allow easier description of the systems and methods described herein and should not be used to limit the present invention in any way.

In the embodiments described with respect to FIGS. 1-7, the transmission line 108 and electrodes 104 and 106 form a CPW for transmission of the RF signal, and in the embodiments described with respect to FIGS. 8-9, the transmission line 108 is configured as a microstrip line for transmission of the RF signal. It should be noted that the switch 102 can be implemented with various types of waveguides and transmission lines, including, but not limited to a CPW, microstrip line, stripline and other waveguides and transmission lines. Furthermore, the deflectable member 112 can be actuated using many various forces, including, but not limited to electrostatic, magnetostatic, thermal, piezoelectric forces, and the like.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method of fabricating a radio frequency (RF) microelectromechanical system (MEMS) asymmetrical switch having two or more resonant frequencies, comprising:
   forming a first electrode, a second electrode and a conductive line between the first and second electrodes on a substrate;
   forming a first insulator layer on at least a portion of the second electrode and a second insulator layer on at least a portion of the conductive line located between the electrodes; and
   forming a deflectable member suspended over the conductive line in spaced relation with the second insulator layer on the conductive line and extending between and continuously asymmetrically coupled to the first and second electrodes, wherein the deflectable member is coupled to a top surface of the first electrode and covers at least a portion of the entire top surface of the first electrode and is coupled to a top surface of the first insulator layer on the second electrode and covers at least a portion of the entire top surface of the first insulator layer on the second electrode defining an area of overlap between the deflectable member and the second electrode, wherein the size of the overlap area at least partially determining a capacitance between the deflectable member and the second electrode, and wherein the deflectable member has an up-state where the deflectable member is coupled to the first electrode and the first insulator layer on the second electrode and out of contact with the insulator layer on the conductive line and a down-state where the deflectable member is coupled to the first electrode and the first insulator layer on the second electrode and in close proximity or is in contact with the insulator layer on the conductive line, wherein the switch has a first and a second resonant frequency in the down state wherein the second resonant frequency is adjustable as a function of the area of overlap between the deflectable member and the second electrode.

2. The method of claim 1, wherein the substrate is a printed circuit board (PCB) substrate.

3. The method of claim 2, wherein forming the first electrode, second electrode and conductive line comprises etching a conductive layer on the PCB substrate to form the first electrode, second electrode and conductive line.

4. The method of claim 3, wherein forming a deflectable member comprises:
   depositing a photoresist layer over the conductive line and between the first and second electrode;
   planarizing the photoresist layer between the first and second electrodes such that the photoresist layer has a height from the substrate substantially the same as the first electrode and the first insulator layer;
   depositing a conductive layer;
   etching the conductive layer to form the deflectable member; and
   removing the photoresist layer.

5. The method of claim 1, further comprising forming one or more symmetrical mode conversion members extending between and symmetrically coupling the one or more mode conversion members to a top surface of the first and second electrodes and suspending over the conductive line in spaced relation to the conductive line, the one or more mode conversion members being suspended at one or more locations a predetermined distance from the deflectable member.

6. The method of claim 1, further comprising tuning the capacitance between the deflectable member and the second electrode by adjusting the adjusting the area of overlap between the deflectable member and the second electrode.

7. The method of claim 1, further comprising tuning the second resonant frequency of the switch in the down state by adjusting the adjusting the area of overlap between the deflectable member and the second electrode.

* * * * *